United States Patent [19]
Zizine

[11] 4,056,003
[45] Nov. 1, 1977

[54] DEVICE FOR MEASURING THE MASS FLOW OR FLOW RATE OF A GAS

[75] Inventor: Jean Louis Zizine, L'Hay-Les-Roses, France

[73] Assignee: S.C.I. Le Brin, Champigny sur Marne, France

[21] Appl. No.: 634,631

[22] Filed: Nov. 24, 1975

[51] Int. Cl.² ............................................. G01F 1/56
[52] U.S. Cl. .................................................. 73/194 F
[58] Field of Search ..................................... 73/194 F

[56] References Cited
U.S. PATENT DOCUMENTS

| | | | |
|---|---|---|---|
| 3,706,938 | 12/1972 | Petriw | 73/194 F X |
| 3,835,705 | 9/1974 | Hadjidjanian | 73/194 F |
| 3,996,795 | 12/1976 | Servassier | 73/194 F |

*Primary Examiner*—Charles A. Ruehl
*Attorney, Agent, or Firm*—Morgan, Finnegan, Pine, Foley & Lee

[57] ABSTRACT

A device for measuring the mass flow or flow rate of a gas which entrains ions produced by an electrode positioned in the path of the gas flow, this electrode being brought to a certain potential with respect to at least one other electrode also arranged in the flow path.

6 Claims, 5 Drawing Figures

DEVICE FOR MEASURING THE MASS FLOW OR FLOW RATE OF A GAS

The present invention relates to a gas measuring device, and more particularly to a device for measuring the mass flow or the flow rate of a gas.

It is known to measure gas flow by means of a jet of ions directed perpendicular to the flow. The jet of ions is generated by the corona effect and the deviation in the path of the ions caused by the gas flow is measured. In such known flowmeters, the ions are generated at a source which may be a disc, a point, or a wire, and are collected on plane or cylindrical metallic electrodes in such a manner that the ion beam crosses the gas flow substantially perpendicular to the direction of the gas flow. Such flowmeters have the disadvantage of being extremely sensitive to the nature of the electric charge carriers (ions) created in the immediate vicinity of the source, as well as to the variations in the speed of transfer of the ions in going from the source to the collector electrode. Moreover, such known flowmeters have a gas flow passage the cross-section of which is limited to a few centimeters to avoid having to apply too high an ionization voltage, and also to provide sufficient accuracy in the measurements.

Further, in the aforementioned known devices, the accuracy of the measurement is affected by all sources of pollution. If for example the gas is humid, the ions may recombine with molecules of water in the course of their transit, and if the gas whose speed is to be measured comprises different ionizable components, these ionizable components are not subjected to the same deviation as the ions of the jet.

Briefly, a measuring device according to the present invention comprises first and second electrodes positioned in the path of the gas flow, the second electrode being spaced from the first electrode in the flow direction, means for providing an electric potential between the first and second electrodes to enable the first electrode to produce ions for entrainment by the gas flow and for passing through the second electrode, and the first and second electrodes being arranged such that an ion passing through the second electrode leaves the first electrode in a direction substantially perpendicular to the surface of the first electrode or to a plane tangent to the point of emission of the ion at the first electrode surface, and is incident on the second electrode in a direction substantially perpendicular to the surface of the second electrode or to a plane tangent to the point of incidence of the ion at the second electrode surface.

With the arrangement of the present invention, the effect of fluctuations in measurement is substantially unaffected by impurities or pollutants in gas, for example, water particles which may combine with the ions generated. Moreover, measurement is substantially independent of the dimensions of the cross-section of the gas flow passage in the measuring device.

In one preferred form of device embodying the present invention, the device is in the form of a gauge with the gas whose flow characteristics are to be determined traversing a conductive electrode and the ions being created in the gas stream upstream of this conductive electrode. The ion flow is measured which has been able to traverse the electrode under the effect of the gas flow to be determined, this electrode is hereafter called a "transparent" electrode.

In a device embodying the invention, there is obtained a high measure of stability which is not disturbed by fluctuations of the ion source, the determination of the proportion of ions which cross the transparent electrode being independent of the flux of incident ions.

The ion source may be very close to the transparent electrode (network or grating). In practice, their distance is limited only by the dielectric rigidity between the ion source and this transparent grating. Thus, there is substantially no possibility that the ions of the gas to be measured will combine with pollutants. In addition, the voltage to be applied between the ion source and the transparent grating is independent of the cross-section of the gas stream, which enables a low operating voltage to be used in all cases.

In another preferred form of a device embodying the invention, the ion flux which has traversed the transparent grating is measured by means of a collector electrode, also in the form of a grating or network, located downstream of the transparent grating. As a consequence, an average measure of the ions appearing on this collector electrode is obtained and the various fluctuations of the ion source, such as emission noise due to condensation of heavy particles, e.g., dust and smoke, on the source which cause dispersion of the discharge do not disturb the measurement.

If desired, a gauge embodying the invention may have a symmetrical structure with respect to the electric field existing in the inter-electrode space. The inter-electrode space is fixed so as to be constant whatever may be the cross-sectional dimension of the flow passage for the gas through the gauge. With this arrangement, the inter-electrode electric field becomes a constant factor for this type of gauge, once the value of the potential difference applied to the ion source is determined. As a result, such a gauge functions independently of the cross-section of the flow passage for the gas. Thus, only a relatively low voltage source of low cost need be used and the accuracy of measurement, for a given voltage source, is practically the same whatever may be the cross-section of the flow passage for the gas stream. Another advantage, more particularly for large passage sections for the gas stream, is that because of this low voltage source, electrical insulation of the electrodes of the gauge is easy to effect.

Another advantage of such a gauge is that it has an ion source with a very low density of electric charge carriers in its immediate vicinity. In the gauges of the prior art, the density of the ions generated is very high, which results in a disturbance in the inter-electrode electric field as soon as a small variation in this ion density appears. These variations necessarily appear as soon as the gas crossing the gauges contains some impurities. In the case of normal air, e.g., water vapor or smoke is in suspension therein with the result that measurements of the flow rate or flow of such a gas by gauges of the prior art is extremely dependent on such impurities.

In apparatus embodying the present invention, the density of electric charge carriers generated may be extremely small compared with the gauges of the prior art, for example 10–100 times smaller. It is thus evident that variations of this density will then, in terms of absolute value, be smaller in the same ratio, and that the effects on the measurements carried out become practically negligible, and in any case are less than the required accuracy.

Further, this low density feature relates to the aging or reliability of the ion source. The ion sources of gauges of the prior art, owing to the high density of electric charge carriers generated, suffers an intense bombardment by these carriers, resulting in a rapid deterioration of the source material. In contrast, ion sources in a low density gauge embodying the present invention, suffer only very small bombardment. Thus, for an identical material, the aging or deterioration is diminished in a ratio sufficient to permit utilization over a much longer time or more intense utilization.

In order that the present invention may be better understood, various embodiments embodying the invention are illustrated in the accompanying drawings. However, it should be understood that the present invention is not limited solely thereto. With reference to the drawings.

Figure 1:
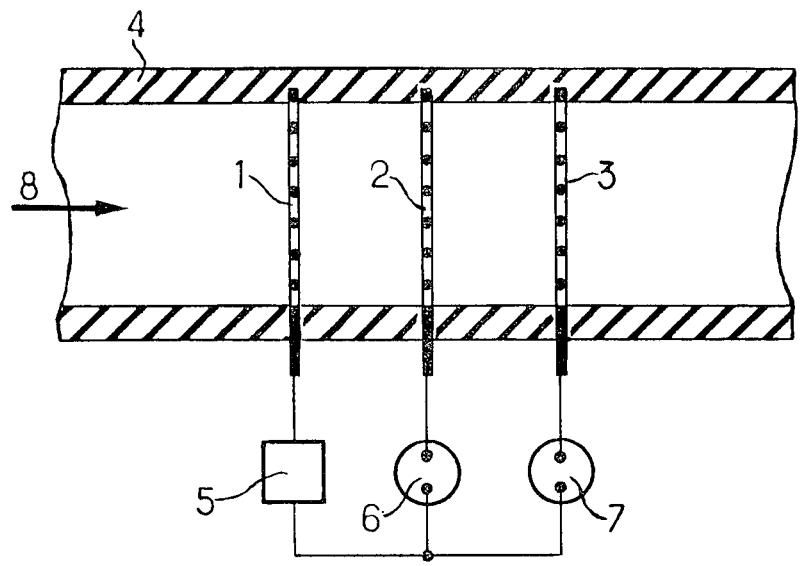
FIG. 1 is a partial sectional view of a device for measuring gas flow with a radioactive ion source.

Referring to FIG. 1, the device for measuring gas flow with a radioactive ion source includes three electrodes 1, 2 and 3 formed of metallic gratings or networks arranged substantially perpendicularly to the gas flow, e.g., within a pipe 4. The electrodes are electrically isolated from one another and dimensioned to occupy practically the entire cross-sectional area of the pipe 4. The electrode 1 is covered with a radioactive coating. A voltage source 5 is connected between the electrode 1 and the electrode 2, to create an electric field between these two electrodes which causes any ions which are generated at electrode 1 to move from electrode 1 toward electrode 2. In addition, a conventional current-measuring device 6 is arranged between the voltage source 5 and the electrode 2 and another conventional current-measuring device 7 is arranged between the electrode 3 and the common point between the voltage source 5 and the current measuring device 6. The arrow 8 indicates the direction of the gas flow through the pipe 4.

The magnitude of the voltage source 5 is adjusted such that its value is sufficient to permit the collection of ions as soon as the speed of gas flow is no longer zero. Let $\vec{E}$ be the value of the electric field in the vicinity of the wires of the electrode grating 2 and $\mu$ be the mobility of the ions in the gas in question (generally expressed in cm$^2$/V.s). When the speed of gas flow is zero, the speed v of the ions at any point in the space $\vec{v} = \mu \cdot \vec{E}$ and nearly all the ions are collected by the electrode 2, since nearly all the lines of force terminate at this electrode 2.

As soon as the gas flow has a speed $v_o$ which is not zero, the speed $\vec{v}$ of the ions is $$\vec{v} = \vec{v}_o + \mu \cdot \vec{E}$$

For all the points in the space for which $|\vec{v}_o| > |\vec{E}/\mu|$ the ions leave the lines of force and are carried beyond the electrode 2 and collected by the electrode 3. The current from electrode 3, indicated by the current-measuring device 7, is thus a well-defined function of the flow speed $v_o$ of the gas. The current-measuring device 6 indicates the current due to the ions collected by the electrode 2 and the current-measuring device 7 indicates the current due to the ions collected by the electrode 3. The currents $I_2$ and $I_3$, which correspond, respectively, to the ions collected by the electrodes 2 and 3, are solely a function of the flow characteristics of the gas.

The distance between the electrodes 1 and 2 is chosen to be sufficiently small to substantially reduce the recombination of the ions generated with, e.g., molecules of water vapor, the lower limit of this distance being in practice determined by the breakdown voltage between the electrodes 1 and 2. This distance is advantageously about 5 millimeters. The distance between the electrodes 2 and 3 is selected to be of approximately the same magnitude as the pitch of the grating constituting the electrode 1, its lower limit being the distance for which the lines of force traverse the electrode 2 when the gas is at rest, without quite reaching the grating electrode 3. (If these lines of force were allowed to reach electrode 3, a current could be read on the current-measuring device 7 even when the speed of the gas flow is zero.)

The pitch of the grating constituting the electrode 2 is approximately the same magnitude as the distance between the electrodes 2 and 3, preferably about 1 millimeter.

Figure 2:
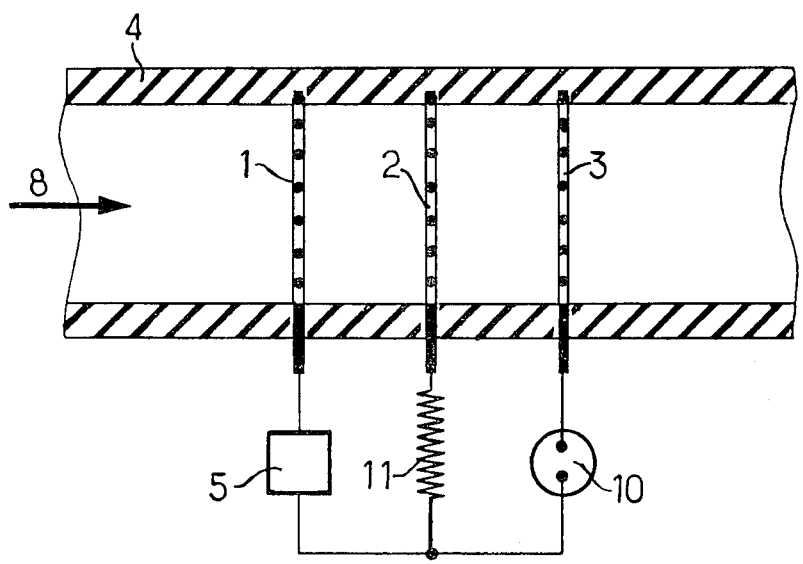
FIG. 2 is a partial sectional view of a device for measuring the gas flow with a corona effect ion source.

FIG. 2 shows another embodiment of the present invention in which the ion source is a corona discharge source. The measuring pipe 4 still comprises the three measuring electrodes 1, 2 and 3, but the electrode 1 is no longer covered with a radioactive coating. The current-measuring device 7 is replaced by a voltmeter 10 having a high input impedance. The input impedance is selected in such a manner that the current flowing through the voltmeter 10 is very small in relation to the operating current of the source and the voltage source 5 has a magnitude such that it produces a corona discharge at the electrode 1. The current-measuring device 6 has also been eliminated and replaced by a resistor 11.

The ions generated at the electrode 1 by the corona discharge move toward the electrode 2 under the effect of the electric field established by the voltage source 5. When the gas whose flow is to be measured is at rest, the ions are practically all collected at the electrode 2.

When the gas whose flow is to be measured has a non-zero speed and moves through the pipe 4 in the direction of the arrow 8, the ions are carried beyond the electrode 2 and reach the electrode 3. Since the voltmeter 10 has a high input impedance, a voltage appears at the electrode 3 which creates an electric field that opposes the ions moving toward the electrode 3. Let $\vec{E}_1$ be the electric field between the electrodes 2 and 3, $\mu$ the mobility of the ions and $\vec{v}_o$ be the speed of the gas to be measured; then when $$\mu \cdot \vec{E}_1 \geq \vec{v}_o$$

the ions will not reach the electrode 3.

The voltage which is generated at the electrode 3 is therefore a unique function of the flow characteristics of the gas and it is therefore easy to measure the speed of flow of the gas or its mass flow by a null method. According to this method, the electric field is such that practically all the ions are captured by the transparent grating 2, in such a manner that the current appearing at the electrode 3 is substantially nil. Owing to the very high resistance of the voltmeter 10, in spite of the very small number of ions arriving at the electrode 3, the voltage between this electrode and the electrode 2 is sufficient to repulse the ions.

Reverting to the arrangement of FIG. 1, $I_3$ is determined as follows:

$$I_3 = K \frac{I_2 e v}{V}$$

$I_3$ being the current at the collector electrode 3, K a constant which depends on the geometry of the device, $I_2$ the current at the electrode 2, $e$ the fluid density, $v$ its speed, and V the difference in potential between the source 1 and the transparent grating 2. It is thus apparent that to measure the rate of flow or the mass flow of the gas, it is necessary to take into account the value of the current $I_2$ and the difference in potential V.

In order to obtain a direct measurement of the gas flow rate $v$ to be measured, a regulated supply can be used in such a manner that $(I_2/V)$ = constant. In this case, the relationship (1) becomes:

$$I_3 = C v$$

C being another constant equal to $$\frac{K I_2 e}{V}$$

Figure 3:
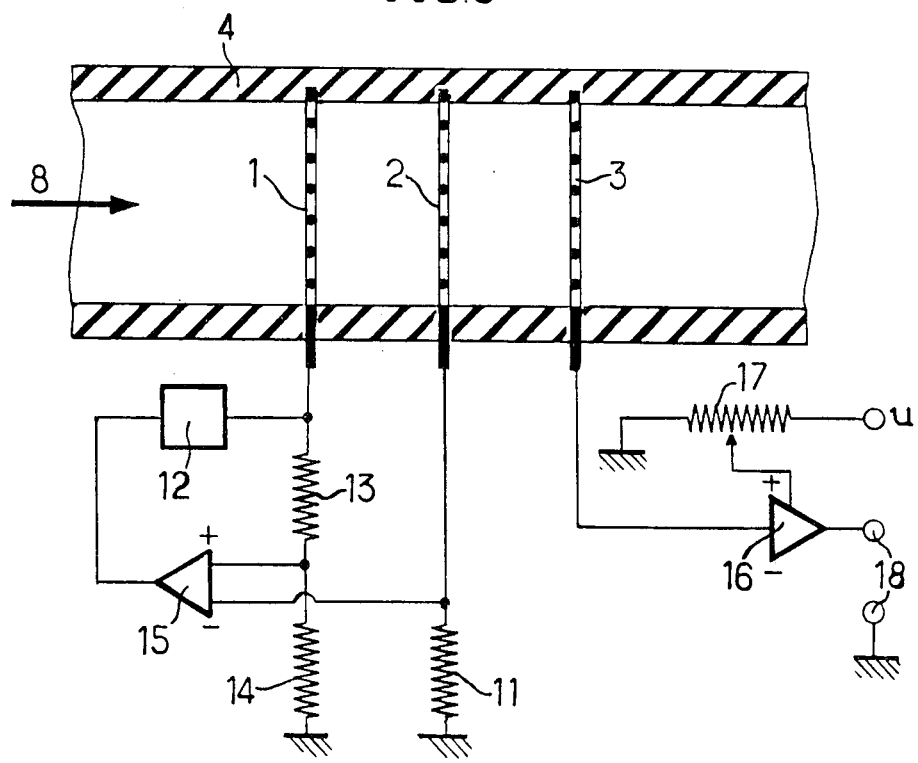
FIG. 3 is a partial sectional view similar to FIG. 2, in which means is provided for regulating the voltage and current suppled to the ion source.

An arrangement capable of carrying out such a direct measurement of the gas flow rate is illustrated in FIG. 3. The electrode 1 is energized by a H.T. source 12, e.g., an oscillator voltage converter. Between the electrode 1 and ground, two resistors 13 and 14 are connected in series, forming a potential divider. The voltage at the junction of the resistors 13 and 14 is applied to the non-inverting input of a differential amplifier 15, the inverting input of which receives the voltage derived from the upper end of a resistor 11 connected between electrode 2 and ground. The output of the differential amplifier 15 is connected to a regulating input of the voltage source 12. The electrode 3 is connected to an amplifier 16 which, in known manner, permits the nulling of the residual current with the aid of a potentiometer 17 connected to an auxiliary voltage source $\mu$; such residual current may appear on electrode 3 when the gas flow rate to be measured is nil and when the electrodes 2 and 3 are very close. At the output 18 of the amplifier 16, a voltage proportional to the flow rate or mass flow of the gas through the gauge is obtained.

If $V_1$ is the voltage between the electrode 1 and earth, $R_{11}$, $R_{13}$ and $R_{14}$ are the respective values of the resistors 11, 13 and 14, the regulation of the voltage source 12 takes place in such a manner that:

$$\frac{V_1 R_{14}}{R_{13} + R_{14}} = R_{11} I_2$$

that is to say the voltages at the inverting and noninverting inputs of the amplifier 15 are equalized. For this condition, $$\frac{I_2}{V_1} = \frac{R_{14}}{R_{11}(R_{13} + R_{14})}$$

This means that the expression $(I_2/V_1)$ is constant for given values of the resistors 11, 13 and 14, the accuracy of its value depending directly on the gain of the amplifier 15, which can be made as high as is required.

Figure 4:
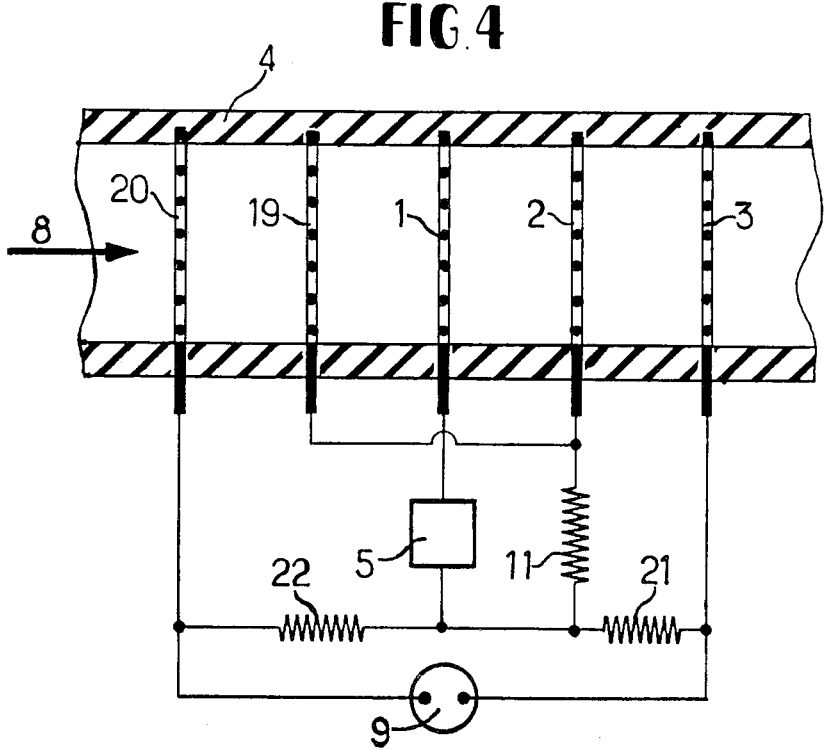
FIG. 4 is a partial sectional view of a device for gas flow measurement with a corona effect ion source, including means for measuring the current at the collector electrode.

FIG. 4 shows another embodiment of a device in accordance with the present invention utilizing a corona discharge ion source and measuring the current at the collector grating 3. In this embodiment, electrodes 19 and 20 are symmetrically arranged with respect to electrode 1, and spaced relative to electrode 1 the same distance as electrodes 2 and 3, respectively. Thus, the device is bi-directional.

Electrodes 2 and 19 are connected to one another and to one side of a high voltage source 5 through a resistor 11; the junction of the resistor 11 and the voltage source 5 is connected to electrodes 3 and 20, respectively, by resistors 21 and 22. A microammeter 9 is connected between electrodes 3 and 20. Thus, the arrangement formed is bi-directional. The value of the high voltage source 5 is chosen to cause a corona discharge about the electrode 1.

In this last embodiment, the operation is substantially the same as that previously described; the resistor 11 through which the current $I_2$ flows develops a voltage, between the electrodes 2 and 3, in such a manner as to improve the linearity of the measuring device. The microammeter 9 indicates the difference between the currents appearing at the electrodes 3 and 20, this difference being characteristic of the flow rate of the gas. As previously described, the voltage source 5 is advantageously constructed in such a manner that the voltage at its terminals and the current which it supplies are in a constant ratio to provide a measurement which is a direction function of the flow rate of the gas.

In all of the embodiments previously described, the operation of the gauge can be adjusted for a nil gas flow rate either by adjusting the distance between the electrodes 2 and 3 with a mechanical device, or preferably by adjusting the electric field around the electrode 2 with a purely electrical adjusting device.

In addition, the embodiments of FIGS. 1–3 can be made bi-directional by adding a pair of electrodes symmetrically spaced about the source electrode 1 the same distance as electrodes 2 and 3.

If desired, the gas flow can be channeled at the ion source section of the pipe 4, this may be accomplished, e.g., by profiling the internal surface of the pipe 4 at this section in such a manner as to form a slight peripheral flaring in the direction of the axis of the pipe 4, so that the gas passes only through the active part of the source electrode.

The embodiments preferably described comprise plane electrodes, arranged in a measuring pipe, but it is evident that comparable measurements can be obtained with electrodes of other forms employing a transparent electrode and a collector electrode(s). For example, electrodes of cylindrical form or of spherical form can be arranged about the source. Moreover, the measurements may be made in open air, if desired.

Figure 5:
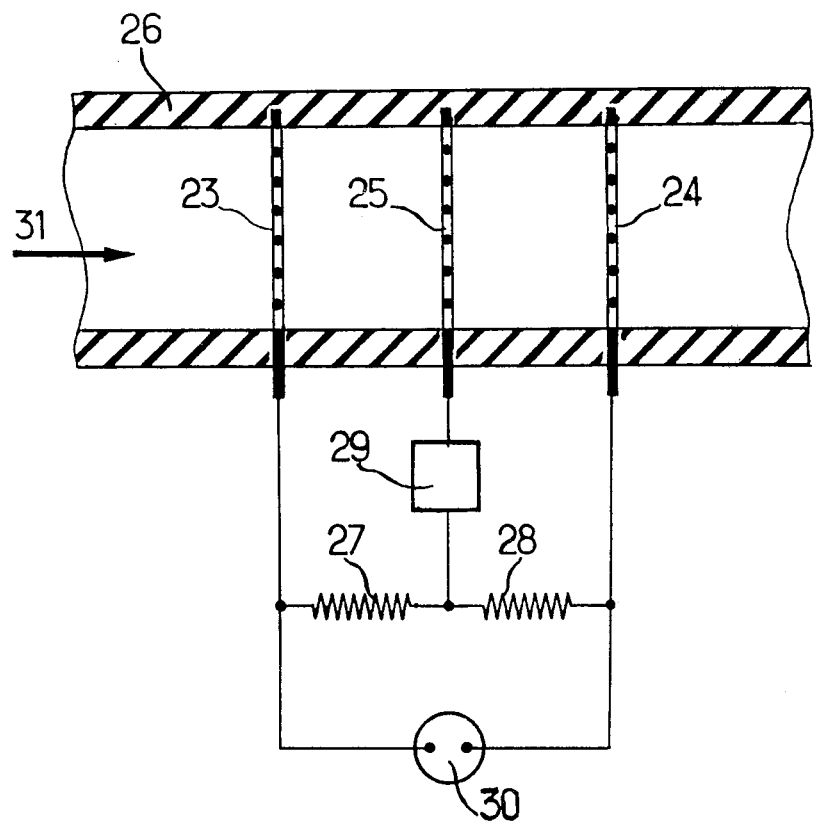
FIG. 5 is a partial sectional view of another form of a device embodying the invention.

Referring to FIG. 5, two plane electrodes 23 and 24, in the form of metal-wire gratings or networks, are arranged symmetrically with respect to another plane electrode 25 serving as ion source and which is also in the form of a grating or network. The electrodes 23, 24 and 25 are arranged inside a measuring pipe 26 and electrically isolated from one another. The electrodes 23 and 24 are connected to one another by two resistors 27 and 28 connected in series. A voltage source 29 is connected between the electrode 25 and the junction of the resistors 27 and 28. Additionally, a current-measuring apparatus 30 is connected between electrodes 23 and 24. The direction of the gas flow to be measured is indicated by the arrow 31.

The three electrodes 23, 24 and 25 are positioned substantially perpendicular to the direction of the gas flow. The electrode 25 is formed of metal wire of small diameter so that it may serve as a corona discharge ion source, by virtue of its connection to the voltage source 29. The measuring apparatus 30, which is in this case a microammeter, measures the difference between the ionic currents $I_1$ and $I_2$, respectively, collected by the electrodes 23 and 24. The resistors 27 and 28 serve to fix the potential of the electrodes 23 and 24.

In the absence of gas flow, the corona discharge is symmetrical on each side of the electrode 25 serving as the ion source and the collected currents $I_1$ and $I_2$ are equal. Thus, no deviation is shown on the current measuring apparatus 30. When the gas flow moves in the direction of the arrow 31, as soon as the ions are generated at the electrode 25 they are carried towards the electrode 24, with the effect being proportional to the gas flow rate. The difference of currents $I_2 - I_1$ indicated by the measuring apparatus 30 thus constitutes an indication of the gas flow rate. This difference $I_2 - I_1$ is proportional on the one hand to the amplitude of the currents $I_1$ and $I_2$, and thus to the sum $I_1 + I_2$, and on the other hand to the product of the flow rate $v$ and the volume $e$, and is inversely proportional to the operating voltage V of the source:

$$I_2 - I_1 = K \frac{(I_1 + I_2) e v}{V}$$

in which K is a constant without dimensions.

The measurement of $e v$ is simplified when the voltage supply 29 is constructed in such a fashion that the quotient $$\frac{I_1 + I_2}{V}$$

is maintained constant. In this case, we have:

$$e v = K' (I_2 - I_1).$$

K' is a constant depending on the gas to be measured, the quotient $$\frac{I_1 + I_2}{V}$$

and on the geometry of the measuring pipe.

In the gauge formed in FIG. 5, space charges are created on each of the two collector electrodes 23 and 24, the space charge created around the electrode 24 being less than that formed around the electrode 23, given that in general the ions are carried toward the electrode 24. The space charges depend on the value of the voltage source 29, which is selected to be greater than a certain limiting value. If it is too small, the space charge is itself too small and the ions are carried beyond the electrode 24.

In this gauge, the measurement principally results from the ions whose path is oblique with respect to the gas flow. The ions whose path is parallel to the gas flow are little affected by the flow, especially for a small space charge, because of the high electric field and because the parallel ions are not as easily carried along.

Preferably, the distance between the electrode 25 and the electrodes 23 and 24 is selected to be of the same order of magnitude as the pitch of the electrode 25. Advantageously, these distances are about 5 millimeters.

As previously stated the gauges of the prior art are sensitive to the effects of pollutants in the gas to be measured, in particular to water vapour which may be contained therein, the molecules of which may recombine with the ions created by the source. In effect, in these prior art gauges the path of the ions between their source and the collector electrodes is relatively great and the risks of recombination are high (it is generally considered that these recombination risks appear when the duration of the ion path is greater than about $10^{-4}$ seconds). On the contrary, with the embodiment of FIG. 5, the path of the ions between the source 25 and the collector electrodes 23 and 24 is very small and there is practically no risk of recombination.

Another advantage of the embodiment of FIG. 5 lies in the fact that owing to the proximity of the collector electrodes 23 and 24 to the source 25, the voltage of the source 29 can be low, without regard to cross sectional area of the pipe 26 through which the gas flow to be measured passes. A further advantage lies in the fact that, more particularly in the case of pipes with a large flow section, owing to this small source voltage there is no problem of electrical isolation of the electrodes.

It is evident that if the direction of flow of the gas is reversed, the indication of the current measuring apparatus 30 will be reversed; advantageously, an apparatus with a center zero or a polarity inversion can be used.

It should be understood by those skilled in the art that various modifications may be made in the present invention without departing from the spirit and scope thereof, as described in the specification and defined in the appended claims.

What is claimed is:

1. A device for measuring the mass flow or rate flow of a gas, comprising:
    first, second and third electrodes positioned in the path of the gas flow, the first, second and third electrodes being electrically isolated from each other, the second electrode being spaced from the first electrode in the flow direction, the third electrode being spaced from the second electrode in the flow direction;
    a voltage source coupled between the first electrode and the second and third electrodes for producing a corona discharge localized about the first electrode and for creating an electric field such that the ions produced by the first electrode move toward the second electrode, in the direction of the gas flow.

2. A device according to claim 1, wherein:
    all the electrodes are arranged within a measuring pipe and are substantially perpendicular to the axis of the pipe, each electrode being a conductive grating or network occupying substantially the entire cross-sectional area of the measuring pipe.

3. A measuring device according to claim 1, including:

fourth and fifth electrodes coupled to said voltage source and symmetrically arranged on the side of the ion source opposite to the second and third electrodes for rendering said measuring device bi-directional; and a microammeter connected between the third and fifth electrodes for measuring the difference between the currents at the third and fifth electrodes which is characteristic of the flow rate of the gas.

4. A measuring device according to claim 1 wherein the distance between said first and second electrodes is approximately 5 millimeters.

5. A measuring device according to claim 4 wherein the distance between said second and third electrodes is approximately 1 millimeter.

6. A measuring device according to claim 5 wherein the pitch of the grating constituting said second electrode is approximately 1 millimeter.

* * * * *